(12) United States Patent
Han et al.

(10) Patent No.: US 9,849,837 B2
(45) Date of Patent: Dec. 26, 2017

(54) VEHICLE CAPABLE OF DETERMINING DRIVING LANE AND CONTROL METHOD FOR THE SAME

(71) Applicant: HYUNDAI MOTOR COMPANY, Seoul (KR)

(72) Inventors: YoungMin Han, Bucheon-si (KR); Sungwoo Choi, Gwangmyeong-si (KR); Seunggeon Moon, Hwaseong-si (KR); Jee Young Kim, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/201,023

(22) Filed: Jul. 1, 2016

(65) Prior Publication Data

US 2017/0166127 A1 Jun. 15, 2017

(30) Foreign Application Priority Data

Dec. 14, 2015 (KR) .................. 10-2015-0178051

(51) Int. Cl.
*B60R 1/00* (2006.01)

(52) U.S. Cl.
CPC .......... *B60R 1/00* (2013.01); *B60R 2300/301* (2013.01); *B60R 2300/607* (2013.01); *B60R 2300/804* (2013.01)

(58) Field of Classification Search
CPC ............... B60R 1/00; B60R 2300/301; B60R 2300/607; B60R 2300/804
USPC .......................................................... 701/36
See application file for complete search history.

(56) References Cited

U.S. PATENT DOCUMENTS

| 5,096,329 A * | 3/1992 | Haile ...................... E01F 9/588 |
| | | 200/86 A |
| 6,370,475 B1 * | 4/2002 | Breed .................. B60N 2/2863 |
| | | 340/436 |
| 6,429,789 B1 * | 8/2002 | Kiridena ................... B60R 1/00 |
| | | 340/905 |
| 2011/0098922 A1 * | 4/2011 | Ibrahim ............... B60W 40/08 |
| | | 701/532 |
| 2015/0151725 A1 * | 6/2015 | Clarke ................. B60W 30/00 |
| | | 701/28 |
| 2016/0209511 A1 * | 7/2016 | Dolinar ................... G01S 19/14 |

(Continued)

FOREIGN PATENT DOCUMENTS

| JP | 8-285941 A | 11/1996 |
| JP | 9-178855 A | 7/1997 |

(Continued)

*Primary Examiner* — Yazan Soofi
(74) *Attorney, Agent, or Firm* — McDermott Will & Emery LLP

(57) ABSTRACT

Disclosed herein are a vehicle capable of determining a driving lane by comparing reference lane line information corresponding to the type of a driving road with estimated lane line information estimated by using surrounding information, and a control method of the vehicle. The vehicle includes a storage configured to store a map including a type of road; a surrounding information acquisition unit configured to acquire surrounding information; and a controller configured to determine a driving lane by comparing reference lane line information corresponding to the type of the driving road verified based on the map with estimated lane line information estimated based on the surrounding information.

16 Claims, 9 Drawing Sheets

(56) References Cited

U.S. PATENT DOCUMENTS

2016/0314359 A1\* 10/2016 Sakamoto .......... G06K 9/00798
2016/0318490 A1\* 11/2016 Ben Shalom ............. B60T 7/12

FOREIGN PATENT DOCUMENTS

| | | |
|---|---|---|
| JP | 2000-251197 A | 9/2000 |
| JP | 2010-211701 A | 9/2010 |
| JP | 2010-231561 A | 10/2010 |
| JP | 4843880 B2 | 12/2011 |
| KR | 10-0789371 B1 | 12/2007 |
| KR | 10-1035538 B1 | 5/2011 |
| KR | 10-1558786 B1 | 10/2015 |

\* cited by examiner

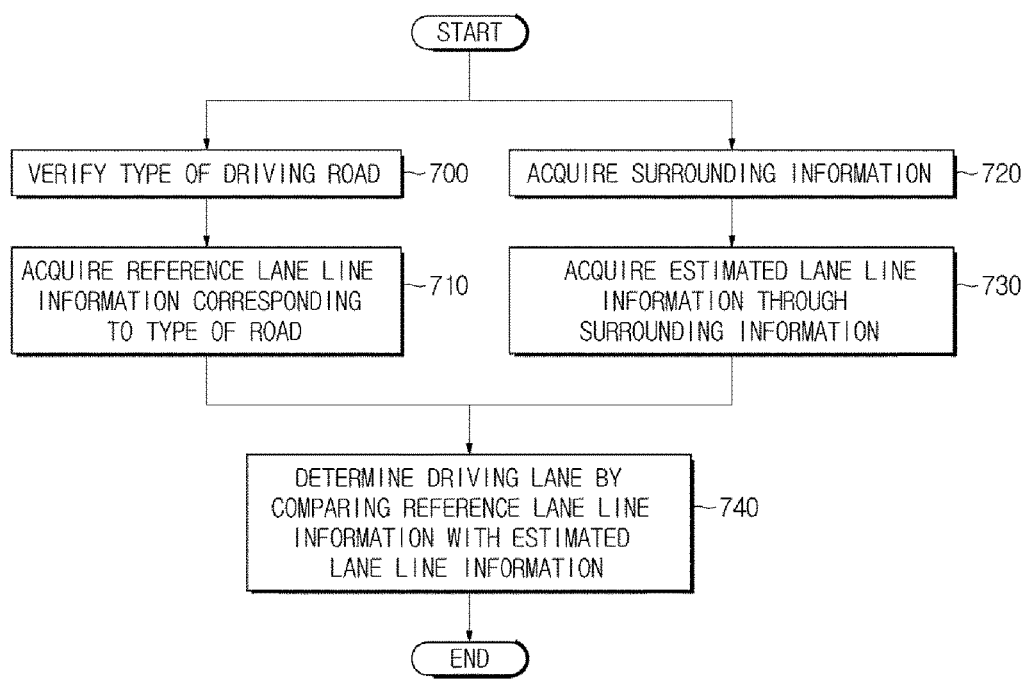

VEHICLE CAPABLE OF DETERMINING DRIVING LANE AND CONTROL METHOD FOR THE SAME

CROSS-REFERENCE TO RELATED APPLICATION(S)

This application claims the benefit of Korean Patent Application No. 10-2015-0178051, filed on Dec. 14, 2015 in the Korean Intellectual Property Office, the disclosure of which is incorporated herein by reference.

BACKGROUND

1. Field

Embodiments of the present disclosure relate to a vehicle to determine a driving lane and a control method of the vehicle.

2. Description of Related Art

A vehicle is able to transport humans, things, or animals from one location to another location while driving on the road and the rail. The vehicle may include a three or four wheeled vehicle, a two-wheeled vehicle, e.g. motorcycle, a construction mechanics, a motor bicycle, a bicycle, and a train driving on the rail.

Recently, in the automotive industry, there has been a growing interest in Advanced Driver Assistance System (ADAS) that provides more convenience and safety to a driver.

Research for an apparatus and a method for predicting a road condition using a detailed map, and providing a proper control and convenience service corresponding to the predicted road condition has been in progress. For example, a vehicle may confirm currently driving road information by using a detailed map, and provide an optimized route to a destination or perform a corresponding control based on the confirmed information.

SUMMARY

Therefore, it is an aspect of the present disclosure to provide a vehicle capable of determining a driving lane by comparing reference lane line information corresponding to the type of a driving road with estimated lane line information estimated based on surrounding information, and a control method of the vehicle.

Additional aspects of the present disclosure will be set forth in part in the description which follows and, in part, will be obvious from the description, or may be learned by practice of the present disclosure.

In accordance with one aspect of the present disclosure, a vehicle includes a storage in which a map including the type of road is stored; a surrounding information acquisition unit configured to acquire surrounding information; and a controller configured to determine a driving lane by comparing reference lane line information corresponding to the type of the driving road verified based on the map with estimated lane line information estimated based on the surrounding information.

The controller may verify the type of the driving road that is determined according to at least one of the use, shapes and sizes.

The controller may determine the type of the driving road as any one of a non-highway, a general road of a highway, a bridge of a highway, an overpass of a highway, a tunnel of a highway, an underground road of a highway, a branch point area of a highway within a pre-determined distance from a branch point, and a junction point area of a highway within a pre-determined distance from a junction point.

The surrounding information acquisition unit may include a camera configured to acquire an image of a front side of the vehicle.

The surrounding information acquisition unit may include a radar configured to detect an object on a lateral side of the vehicle.

The controller may acquire a possibility that each lane forming the road becomes the driving lane by comparing the reference lane line information with the estimated lane line information.

The controller may acquire a possibility that each lane becomes the driving lane with reference to an accuracy of each lane of the estimated lane line information.

The controller may acquire the estimated lane line information including at least one of a type and color of lane line on the road, a distance to a lateral object, and a shape of the lateral object from the surrounding information.

The controller may determine a driving lane by comparing the reference lane line information including at least one of the top lane line information and the lowest lane line information corresponding to the type of the driving road with the estimated lane line information estimated by using the surrounding information.

The controller may determine the driving lane every predetermined period.

The controller may determine a first driving lane at a first point of time by comparing the reference lane line information with the estimated lane line information, determine whether to change the lane based on the driving information of the vehicle during a single period from the first point of time, and determine a second driving lane at a second point of time after a single period from the first point of time based on the determined presence of the change of the lane.

The vehicle may further include a display unit configured to display the determined driving lane.

In accordance with another aspect of the present disclosure, a control method of a vehicle includes verifying the type of a driving road; acquiring reference lane line information corresponding to the verified type of road; acquiring surrounding information; acquiring estimated lane line information estimated by using the surrounding information; and determining a driving lane by comparing the reference lane line information with the estimated lane line information.

The verification of the type of a driving road may include verifying the type of the driving road that is determined according to at least one of the use, shapes and sizes.

The verification of the type of a driving road may include determining the type of the driving road as any one of a non-highway, a general road of a highway, a bridge of a highway, an overpass of a highway, a tunnel of a highway, an underground road of a highway, a branch point area of a highway within a pre-determined distance from a branch point, and a junction point area of a highway within a pre-determined distance from a junction point.

The acquisition of surrounding information may include acquiring an image of a front side of the vehicle.

The acquisition of surrounding information may include detecting an object on a lateral side of the vehicle.

The determination of driving lane may include acquiring a possibility that each lane forming the road becomes the driving lane by comparing the reference lane line information with the estimated lane line information.

The determination of driving lane may include acquiring a possibility that each lane becomes the driving lane with reference to an accuracy of each lane of the estimated lane line information.

The acquisition of estimated lane line information may include acquiring the estimated lane line information including at least one of the type and color of lane line on the road, a distance to a lateral object, and a shape of the lateral object from the surrounding information.

The acquisition of reference lane line information may include acquiring the reference lane line information including at least one of the top lane line information and the lowest lane line information corresponding to the type of the road.

The determination of a driving lane may include determining a first driving lane at a first point of time by comparing the reference lane line information with the estimated lane line information.

The control method may further include determining whether to change the lane during a single period from the first point of time based on the driving information of the vehicle, and determining a second driving lane at a second point of time after a single period from the first point of time based on the determined presence of the change of the lane.

The control method may further include displaying the determined driving lane.

BRIEF DESCRIPTION OF THE DRAWINGS

These and/or other aspects of the disclosure will become apparent and more readily appreciated from the following description of embodiments, taken in conjunction with the accompanying drawings of which:

FIG. 7 is a flow chart illustrating a control method of a vehicle in accordance with one embodiment of the present disclosure.

DETAILED DESCRIPTION

Reference will now be made in detail to embodiments of the present disclosure, examples of which are illustrated in the accompanying drawings.

Figure 1:
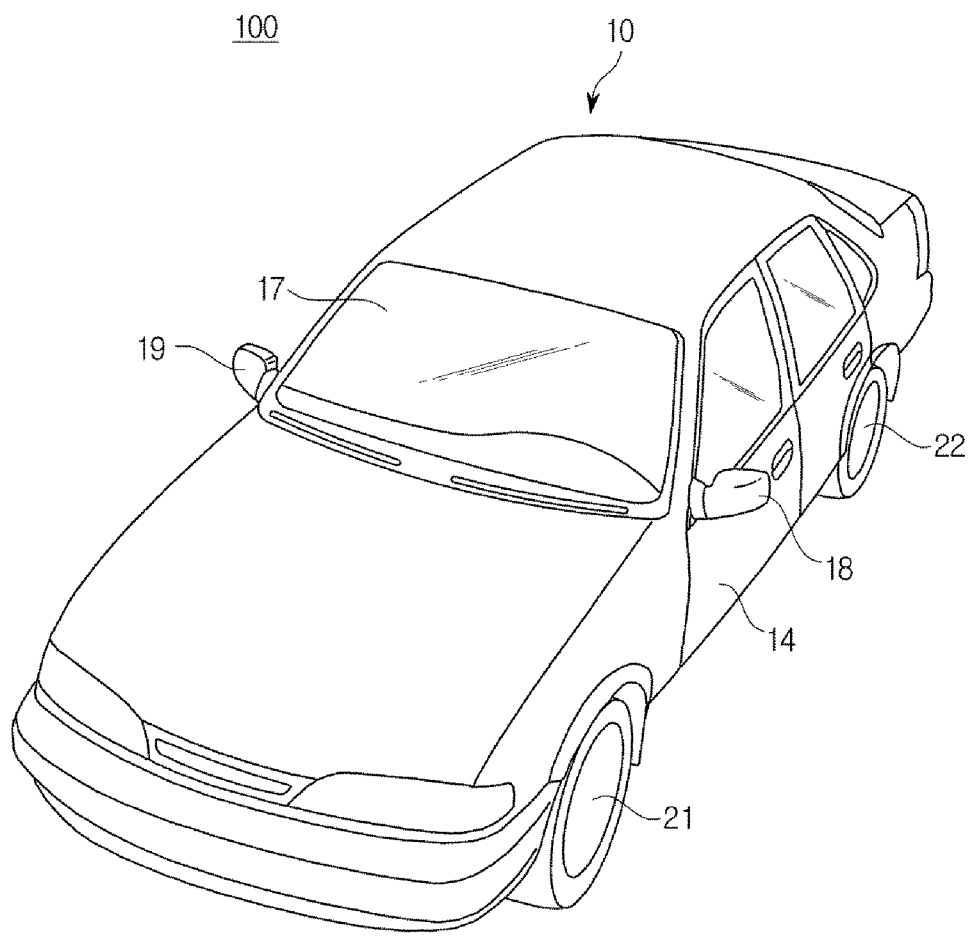
FIG. 1 is a view illustrating an exterior of a vehicle in accordance with one embodiment of the present disclosure.

FIG. 1 is a view illustrating an exterior of a vehicle in accordance with one embodiment of the present disclosure.

Referring to FIG. 1, according one embodiment a vehicle 100 may include a body 10 forming an exterior of the vehicle 100, vehicle wheels 21 and 22 moving the vehicle 100, a door 14 closing the inside of the vehicle 100 from the outside, a front glass 17 providing a front view of the vehicle 100 to a driver inside the vehicle 100, and side mirrors 18 and 19 providing a view of a rear side of the vehicle 100 to the driver.

The vehicle wheels 21 and 22 may include a front wheel 21 provided on a front of the vehicle 100 and a rear wheel 22 provided on a rear of the vehicle 100, and may move the body 10 forward and backward by receiving a torque from a driving device that is described later.

The door 14 may be rotatably provided on a right side and a left side of the body 10. When the door 14 is opened, a driver may be allowed to be seated in the vehicle 100, and when the door 14 is closed, the inside of the vehicle 100 may be closed from the outside.

The front glass 17 may be provided on an upper portion of the front of the body 10 to allow a driver inside the vehicle 100 to acquire visual information in front of the vehicle 100 and may be referred to as "windshield glass"

The side mirrors 18 and 19 may include a left side mirror 18 provided on the left side of the body 10 and a right side mirror 19 provided on the right side of the body 10. The side mirrors 18 and 19 may allow a driver inside the vehicle 100 to acquire visual information of the lateral side and the rear side of the vehicle 100.

Figure 2:
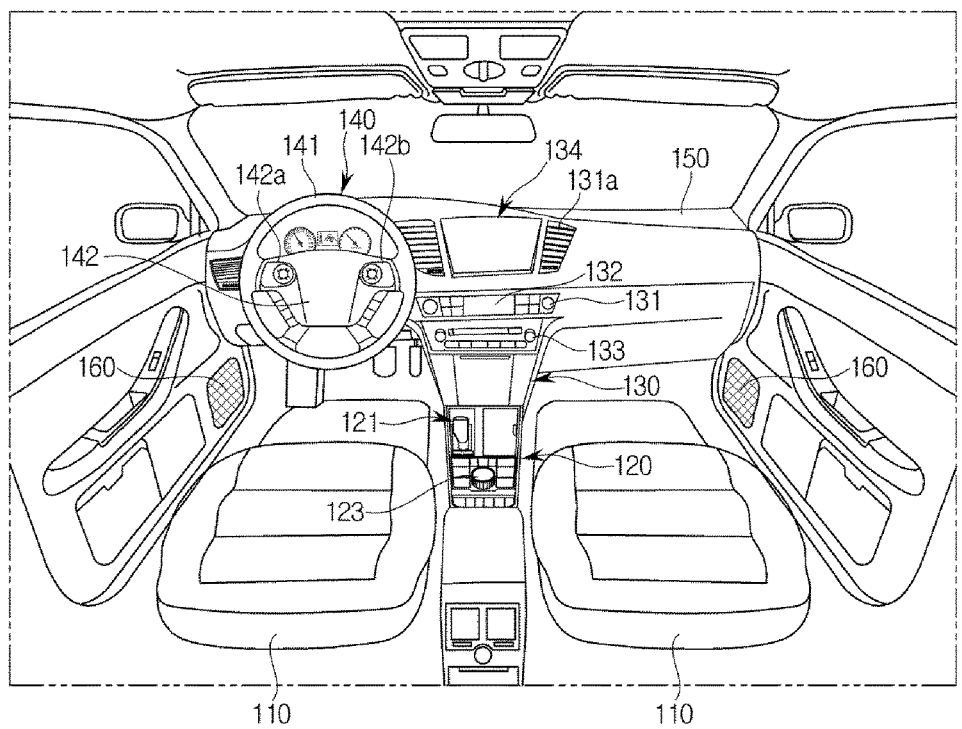
FIG. 2 is a view illustrating an internal configuration of a vehicle in accordance with one embodiment of the present disclosure.

FIG. 2 is a view illustrating an internal configuration of a vehicle in accordance with one embodiment of the present disclosure.

As illustrated in FIG. 2, the vehicle 100 may include a seat 110 in which a driver is seated, a dashboard 150 in which a gear box 120, a center fascia 130, and a steering wheel 140 are provided.

In the gear box 120, a gear lever 121 configured to change a speed of the vehicle 100, and a dial operation unit 122 configured to control an operation of functions of the vehicle 100 may be installed.

The steering wheel 140 provided in the dashboard 150 may be a device configured to adjust a driving direction of the vehicle 100, and may include a rim 141 held by the driver and a spoke 142 connected to a steering system of the vehicle 100 and configured to connect the rim 141 to a hub of a rotation shaft for the steering. According to the embodiment, operation devices 142a and 142b may be formed in the spoke 142 to control various devices inside the vehicle 100, e.g. an audio device.

In the center fascia 130 of the dashboard 150, an air conditioning device 131, a clock 132, an audio device 133 and a display unit 134 may be installed.

The air conditioning device 131 may keep an air inside the vehicle 100 in fresh by controlling a temperature, a moisture, an air cleanliness, and a flow of air of the inside of the vehicle 100. The air conditioning device 131 may be installed in the center fascia 130 and may include at least one discharging port 131a discharging air. A button or a dial may be installed in the center fascia 130 to control the air conditioning device 131. A passenger including a driver may control the air conditioning device 131 by using a button disposed on the center fascia 130.

The clock 132 may be provided adjacent to a button or a dial that is configured to control the air conditioning device 131.

The audio device 133 may include an operation panel in which a number of buttons are provided to perform functions of the audio device 133. The audio device 133 may provide a radio mode configure to provide a radio function, and a media mode configured to play an audio file of various storage media in which the audio file is stored.

The display unit 134 may display a user interface (UI) configured to provide information related to the vehicle 100 to a driver in the type of image and text. For this, the display unit 134 may be embedded in the center fascia 130. However, the installation of the display unit is not limited thereto, and alternatively, the display unit 134 may be detachably installed in the center fascia 130.

In this case, the display unit 134 may be implemented by Liquid Crystal Display (LCD), Light Emitting Diode (LED), Plasma Display Panel (PDP), Organic Light Emitting Diode (OLED), and Cathode Ray Tube (CRT), but is not limited thereto.

In addition, the dashboard 150 may further include various gauge boards indicating a driving speed of the vehicle 100, and the number of engine rotation or fuel residual quantity, and a globe box in which various things are stored.

The vehicle may provide information related to a driving to a driver by using a pre-stored map. For example, the vehicle may confirm a current location in a map and provide a route to a destination from the confirmed location. In addition, the vehicle may automatically control the speed or a head lamp according to the current location on the map.

To provide the above-mentioned function in real time, the vehicle may be required to predict a driving route. Particularly, when a branch point or a junction point is present ahead of a driving direction, the vehicle may be needed to select any one of plurality of roads that is extended from the branch point or the junction point, and continue the driving. At this time, unless the vehicle predicts a driving direction to be proceeded, it may be difficult for the vehicle to provide a function corresponding to the current location in real time.

Therefore, the vehicle may predict a driving route of the vehicle in a variety of methods. For example, the vehicle may perform a prediction by determining a driving lane. A user may select a certain lane to go to any one road that is extended from a branch point or a junction, and thus the vehicle may determine a driving lane in advance and may predict a driving route based on the determined driving lane.

Hereinafter a vehicle configured to determine a driving lane will be described in detail.

Figure 3:
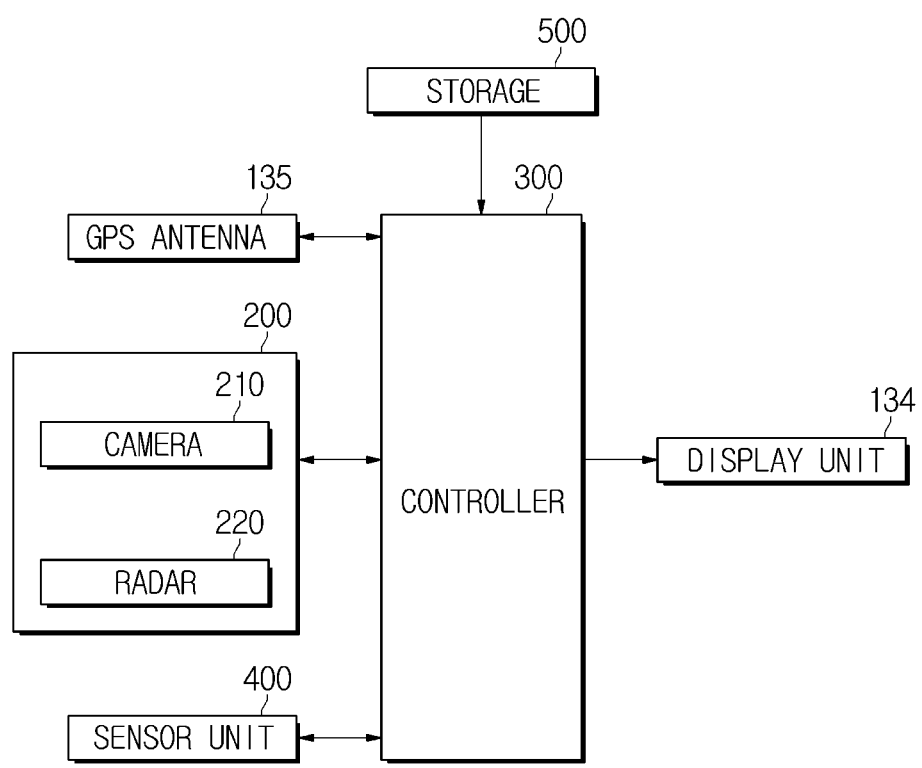
FIG. 3 is a control block diagram illustrating a vehicle in accordance with one embodiment of the present disclosure.
Figure 4:
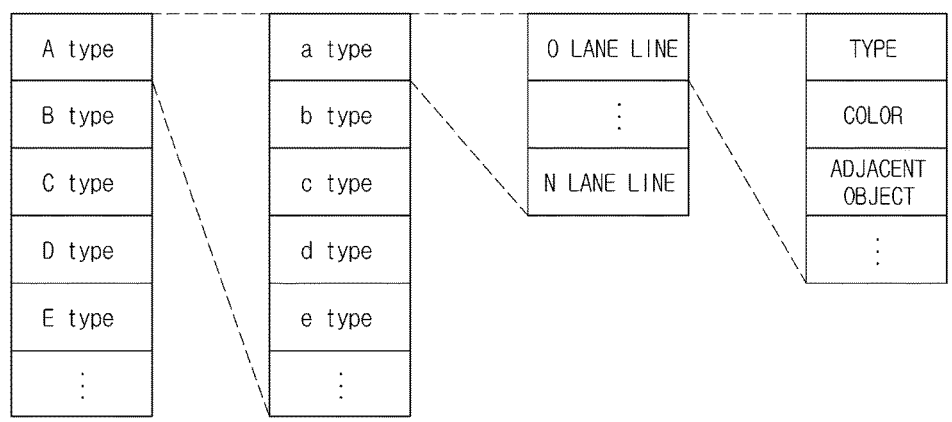
FIG. 4 is a view illustrating a configuration of basic lane line information in accordance with one embodiment of the present disclosure.

FIG. 3 is a control block diagram illustrating a vehicle in accordance with one embodiment of the present disclosure and FIG. 4 is a view illustrating a configuration of basic lane line information in accordance with one embodiment of the present disclosure.

Referring to FIG. 3, the vehicle according to one embodiment may include a Global Positioning System (GPS) antenna 135 configured to receive a satellite signal including location information of the vehicle; a surrounding information acquisition unit 200 configured to acquire surrounding information; a sensor unit 400 configured to acquire driving information of the vehicle; a display unit 134 configured to display information related to the driving; a controller 300 configured to control each component of the vehicle; and a storage 500 configured to store information for an operation of each component of the vehicle in advance.

The storage 500 may store information for an operation of the vehicle in advance, and may provide the information as needed. For example, the storage 500 may store an algorithm or a parameter that is used by the controller 300 described later to control the vehicle in advance, and may provide the algorithm or the parameter when there is a request from the controller 300.

In addition, the storage 500 may store a map to be provided to the controller 300, which is described later, in advance. Particularly, the storage 500 may pre-store any one of a general map and a detailed map including the type of road and the number of lanes. In this case, the detailed map may have a high accuracy for safe and accurate control of the vehicle, and include information related to a height, an inclination, a curvature, and the number of lanes as well as plane location of the road, and further include road facilities, e.g. traffic regulation signs and traffic lights. However, a map stored in the storage 500 may not include lane line information of each road.

The storage 500 may pre-store basic lane line information to be provided to the controller 300 that is described later. Basic lane line information may represent lane line information determined by the type of road. In addition, the type of road may be classified by at least one of the use, shapes, and sizes of the road or the classification may be applied in accordance with regulations of each country.

Referring to FIG. 4, the storage 500 may store basic lane line information in a tree structure in advance, wherein the tree structure may represent that the basic lane line information is classified by the type of the road. FIG. 4 illustrates an exemplary of basic lane line information in which the type of the road is classified by two standards, and lane line information corresponding to each of the classified road is included.

For example, the road may be first classified by the use. Particularly, the road may be classified into a highway that is exclusive for vehicles and connects major cities, and a non-highway by the use. In this case, the non-highway may be subdivided into a national road and a local road. The name of the road is in accordance with the use defined by, for example, Korean regulations, but the name of the road may vary by the classification according to the use.

When the road is classified into the highway and the non-highway according to the use, the highway may be classified by the shape. For example, the highway may be classified into a bridge, an overpass, a tunnel, an underground road, a branch point area within a pre-determined distance from a branch point, a junction point area within a pre-determined distance from a junction point, and other general road.

The above-mentioned embodiment illustrates that the type of road is classified by a pre-determined reference, and it may be possible to classify the road by the type according to various criteria.

After the classification, the reference lane line information may be stored corresponding to the type of each road. The reference lane line information may be related to characteristics of lane line, and thus may include the type and color of the lane line, and information related to an adjacent object.

Since the reference lane line information is applied to all roads included in the same type, the reference lane line information may include characteristics required by a lane line in the road classified as the same type.

For example, the reference lane line information may include characteristics of the top lane line, 0 (zero) lane line and the lowest lane line, N lane line, and may be in accordance with Table 1.

TABLE 1

| The type of road | | Reference lane line information (type/color/adjacent object) | |
|---|---|---|---|
| | | 0 lane line | N lane line |
| Highway | General road | Solid line/yellow/guardrail | Solid line/—/— |

TABLE 1-continued

| | Reference lane line information (type/color/adjacent object) | |
|---|---|---|
| The type of road | 0 lane line | N lane line |
| Bridge/Overpass | —/yellow/guardrail | Solid line/—/— |
| Tunnel/underground road | —/—/guardrail | Solid line/—/— |
| Branch point area | —/yellow/guardrail | Solid line/—/sign |
| Junction point area | —/yellow/guardrail | Solid line/—/— |
| ... | | ... |

According to Table 1, the reference lane line information may include a first reference lane line information, a second reference lane line information, a third reference lane line information, a fourth reference lane line information, a fifth reference lane line information, a sixth reference lane line information, a seventh reference lane line information, an eighth reference lane line information, a ninth reference lane line information, and a tenth reference lane line information. The first reference lane line information may indicate that the top lane line (0 lane line) of the general road of the highway has a solid line, a yellow color and a guardrail adjacent thereto, the second reference lane line information may indicate that the top lane line (0 lane line) of the bridge and overpass of the highway has a yellow color and a guardrail adjacent thereto, the third reference lane line information may indicate that the top lane line (0 lane line) of the tunnel and underground road of the highway has a guardrail adjacent thereto, the fourth reference lane line information may indicate that the top lane line (0 lane line) of the branch point area of the highway has a yellow color and a guardrail adjacent thereto, and the fifth reference lane line information may indicate that the top lane line (0 lane line) of the junction point area of the highway has a yellow color and a guardrail adjacent thereto. The sixth reference lane line information may indicate that the lowest lane line (N lane line) of the general road of the highway has a solid line, the seventh reference lane line information may indicate that the lowest lane line (N lane line) of the bridge and overpass of the highway has a solid line, the eighth reference lane line information may indicate that the lowest lane line (N lane line) of the tunnel and underground road of the highway has a solid line, the ninth reference lane line information may indicate that the lowest lane line (N lane line) of the branch point area of the highway has a solid line and a speed limit sign adjacent thereto, and the tenth reference lane line information may indicate that the lowest lane line (N lane line) of the junction point area of the highway has a solid line.

However, Table 1 above is an exemplary embodiment of the reference lane line information, and thus reference lane line information may include any part of the first reference lane line information and the tenth reference lane line information or may include information different therefrom.

For example, the reference lane line information may include an eleventh reference lane line information indicating that N−1 lane line adjacent to the lowest lane line (N lane line) of the branch point area of the highway has a double line, and an twelfth reference lane line information indicating that N−1 lane adjacent to the lowest lane line (N lane line) of the junction point area of the highway has a double line. In addition, Table 1 illustrates information of the top lane line and the lowest lane line of the road, but the reference lane line information may include information of other lane line. For example, the rest lane line except the top lane line of the highway may have a vehicle adjacent to the left side and the rest lane line except the lowest lane line of the highway may have a vehicle adjacent to the right side.

The storage 500 may be implemented by at least one medium of flash memory, hard disc, multimedia card micro type, memory in the type of card type (e.g. SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disc, and optical disc.

Referring to FIG. 3 again, the antenna 135 may receive a satellite signal emitted from the satellite, and may provide the satellite signal to the controller 300. At this time, the satellite signal received via the antenna 135 may include location information of vehicle.

When receiving the satellite signal, the controller 300 may match a current location of the vehicle with a map that is pre-stored in the storage 500. The satellite signal received via the antenna 135 may include current coordinates of the vehicle and thus the controller 300 may match a location corresponding to current coordinates of the vehicle with the map.

By matching the current location of the vehicle with the map, the controller 300 may verify a road in which the vehicle is driving. As mentioned above, the pre-stored map may include the type of the road and the number of the lane so that the controller 300 may also verify the type of driving road and the number of lanes of the driving road.

The surrounding information acquisition unit 200 may acquire surrounding information of the vehicle. In this case, the surrounding information may include surrounding information related to the front side, and the lateral side of the vehicle that is used to determine a lane of the vehicle.

For this, the surrounding information acquisition unit 200 may include a camera 210 configured to acquire an image of the front side of the vehicle and a radar 220 configured to detect an object in the lateral side of the vehicle.

The camera 210 may be installed in the front surface of the vehicle to record an image of the front side of the vehicle. For this, the camera 210 may include an image sensor, and the image sensor may be implemented by Charge Coupled Device (CCD) or Complementary Metal Oxide Semiconductor (CMOS).

The radar 220 may be installed in the lateral side of the vehicle to detect an object adjacent to the lateral side of the vehicle. The radar 220 may radiate pulses to the lateral side and may receive an echo pulse reflected from the object. The received echo pulse may include information related to the presence of an object in the lateral side, a distance to the object on the lateral side, and the shape of the object on the lateral side.

The controller 300 may determine a driving lane by comparing reference lane line information corresponding to the type of the road with estimated lane line information estimated by using surrounding information.

For this, first, the controller 300 may verify reference lane line information corresponding to the type of driving road that is verified via a satellite signal received via the antenna 135. As mentioned above, the storage 500 may store reference lane line information in advance and the stored reference lane line information may be stored after being classified by the type of the road. Therefore, the controller 300 may receive reference lane line information corresponding to the type of the driving road from the storage 500.

In addition, the controller 300 may estimate lane information from the surrounding information acquired via the surrounding information acquisition unit 200. For example, when an image of the front side is acquired by the camera 210, the controller 300 may extract a lane in the front road from the front image. The controller 300 may acquire estimated lane line information by verifying characteristics of the extracted lane.

For another example, when an object on the lateral side is detected by the radar 220, the controller 300 may verify information related to the distance to the object on the lateral side and the shape of the object on the lateral side from echo pulses. As a result of that, the controller 300 may acquire estimated lane line information.

For example, when an object is detected on one side of the vehicle by the radar 220, echo pulses may include information related to a distance to the object from the one side of the vehicle. In addition, the echo pulse may have a pattern corresponding to the shape of the corresponding object. Therefore, the controller 300 may acquire estimate lane line information in that a certain object is placed to be adjacent to a certain lane, based on the distance between pre-determined lane lines.

After the reference lane line information and the estimated lane line information are acquired, the controller 300 may determine a driving lane by comparing the reference lane line information with the estimated lane line information. Hereinafter an operation of the controller 300 configured to determine a driving lane will be described in detail.

Figure 5:
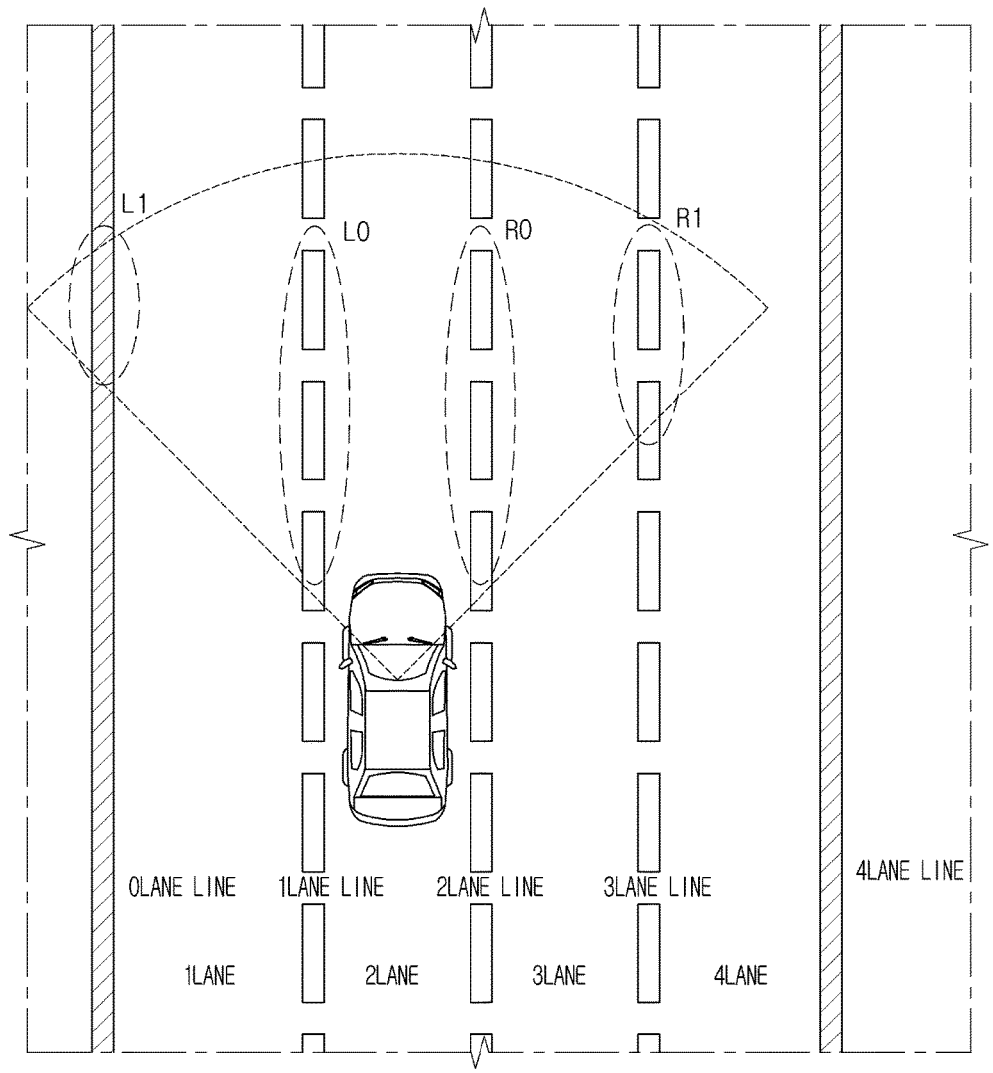
FIG. 5 is a view illustrating a process of determining a driving lane by a controller in accordance with one embodiment of the present disclosure.

FIG. 5 is a view illustrating a process of determining a driving lane by a controller in accordance with one embodiment of the present disclosure. FIG. 5 illustrates the general road of the highway including from 0 (zero) lane line to fourth lane line and is divided into from a single lane to four lanes. In addition, a radius area in FIG. 5 may represent a range of a front image acquired by the camera 210 of the vehicle.

As mentioned above, the controller 300 may extract a lane from the front image. In a case of FIG. 5, the controller 300 may extract L0, and L1 lane line on the left side of the vehicle and R0 and R1 lane line on the right side of the vehicle in the order of distances to the vehicle. By extracting the lane line, the controller 300 may acquire estimated lane line information about L0, L1, R0, and R1 lane line. The estimated lane line information acquired by the controller 300 in FIG. 5 is table 2 in the followings.

TABLE 2

| | Lane line | | | |
|---|---|---|---|---|
| | L1 | L0 | R0 | R1 |
| type | Solid line | Dashed line | Dashed line | Non-recognition |
| color | Non-recognition | white | white | Non-recognition |

Meanwhile, since the estimated lane line information is acquired by processing the surrounding information acquired by 200, the accuracy of the estimated lane line information may vary according to the performance of the surrounding information acquisition unit 200 and the location of the vehicle. The accuracy may be determined in advance when being manufactured, and a value thereof may be stored in the storage 500 in advance. The accuracy of the estimated lane line information acquired by the controller 300 in FIG. 5 is shown in table 3.

TABLE 3

| | Lane line | | | |
|---|---|---|---|---|
| | L1 | L0 | R0 | R1 |
| type | 0.5 | 1 | 1 | 0.5 |
| color | 0.25 | 0.5 | 0.5 | 0.25 |

The controller 300 may determine a driving lane by comparing the acquired estimated lane line information with pre-stored reference lane line information. Particularly, the controller 300 may calculate a possibility that each lane becomes a driving lane.

For this, the controller 300 may calculate a matching point of each lane by comparing the estimated lane line information with the reference lane line information. That is, the controller 300 may calculate a matching point by assigning a point to a pre-determined lane when the estimated lane line information is identical to the reference lane line information and by assigning 0 (zero) to the rest lane when the estimated lane line information is not identical to the reference lane line information. In this time, the controller 300 may use the accuracy of the pre-stored estimated lane line information about each lane as a weighted value.

Tables 4 to 6 illustrate a method of assigning a point according to the condition.

TABLE 4

| condition | point | Type of road |
|---|---|---|
| L0 = yellow | Line1 = +a | In highway |
| L0 ≠ yellow | Line2~N = +b | General road, bridge/overpass, |
| L1 = yellow | Line2 = +a | branch point area, junction point |
| L1 ≠ yellow | Line1,3~N = +b | area |

TABLE 5

| condition | point | Type of road |
|---|---|---|
| L0 = solid line | Line1 = +a | In highway |
| L0 ≠ solid line | Line2~N = +b | General road |
| R0 = solid line | LineN = +a | |
| R0 ≠ solid line | Line1~(N − 1) = +b | |
| L1 = solid line | Line2 = +a | |
| L1 ≠ solid line | Line1,3~N = +b | |
| R1 = solid line | LineN − 1 = +a | |
| R1 ≠ solid line | Line1~(N − 2), N = +b | |

TABLE 6

| condition | point | Type of road |
|---|---|---|
| L0 = double line | LineN_main + 1 = +a | In highway |
| R0 = double line | LineN_main = +a | General road, bridge/overpass, branch point area, junction point area |

As illustrated in Tables 4 to 6, point 'a' may be larger than point 'b'. N may represent the number of total lanes. N_main may represent the number of total lane of the main road from a branch point.

FIG. 5 illustrates the general road of the highway, and thus the controller 300 may assign a point according to tables 4 to 6.

According to Table 4, since L0 is not yellow and L1 is yellow, the controller 300 may assign a point 'b' to a second to a fourth lane and then assign a point 'a' to the second lane. In addition, since the color accuracy of L0 is 0.5, the controller 300 may multiply 0.5 by a point 'b' assigned to from the second lane to the fourth lane. By the same way, since the color accuracy of L1 is 0.25, the controller 300 may multiply 0.25 by a point 'a' assigned to the second lane.

According to Table 5, since L0 is not a solid line, L1 is a solid line, R0 is not a solid line, and R1 is not a solid line, the controller 300 may assign a point 'b' to from a second to a fourth lane, assign a point 'a' to the second lane, assign point 'b' to the first, third, and fourth lane, and assign point 'b' to the first, second, and fourth lane. In addition, in consideration with the accuracy of the type of the road in the estimated lane line information, the controller 300 may multiply the accuracy '1' by a point 'b' assigned to from the second lane to the fourth lane, multiply the accuracy '0.5' by a point 'a' assigned to the second lane, multiply the accuracy '1' by a point 'b' assigned to the first, third, and fourth lane, and multiply the accuracy '0.5' by a point 'b' assigned to the first, second, and fourth lane.

According to Table 6, all of L0, L1, R0, and R1 is not a double line, and thus the controller 300 may not assign a point to any lane.

After assigning a point to each lane according to the above-mentioned method, the controller 300 may acquire a matching point by adding all of point assigned to each lane. If it is assumed that a point 'a' is '1' and a point 'b' is '0.5', a matching point of each lane is calculated according to Table 7.

TABLE 7

| | lane | | | |
|---|---|---|---|---|
| | First lane | Second lane | Third lane | Fourth lane |
| Matching point | 0.75 | 2.50 | 1.50 | 1.25 |

Referring to Table 7, it is confirmed that a matching point of the second lane is the highest. Therefore, the controller 300 may determine that the second lane is a driving lane.

FIG. 5 illustrates that the estimated lane line information is acquired through the front image acquired by the camera 210 and a driving lane is determined by using the estimated lane line information. Alternatively, the presence of an adjacent object is verified by the radar 220 and a driving lane is determined by using the estimated lane line information acquired through the verification.

The calculation of the matching point may be performed by determining whether an object e.g. a guardrail, a speed limitation sign, or an adjacent vehicle, is placed within a pre-determined distance.

The controller 300 may be implemented by hardware, e.g. Micro Processor, and alternatively by software, e.g. program operated by hardware. In addition, when the controller 300 is implemented by hardware, the controller 300 may be implemented by a single hardware or a combination of a plurality of hardware.

When a driving lane is determined by the controller 300, the display unit 134 may display the determined driving lane.

Figure 6A:
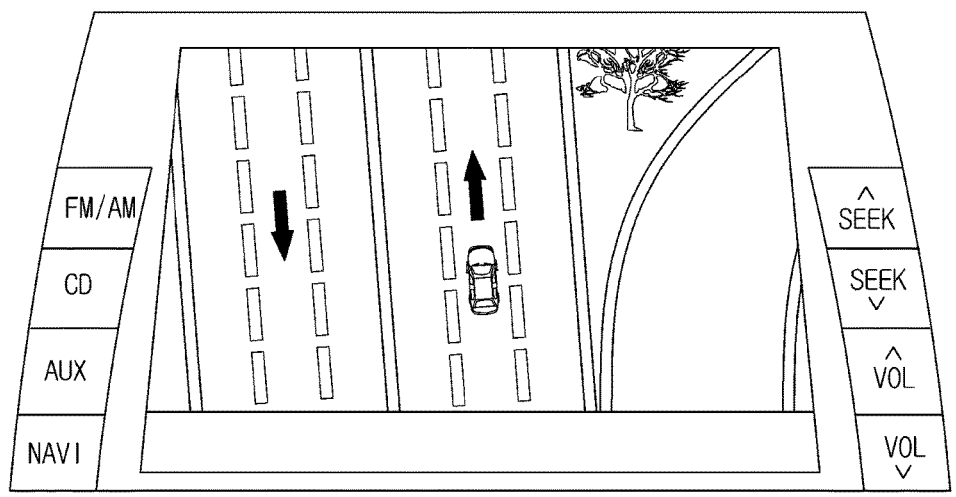
FIGS. 6A and 6B are views illustrating a displaying method of a display unit in accordance with embodiments of the present disclosure.
Figure 6B:
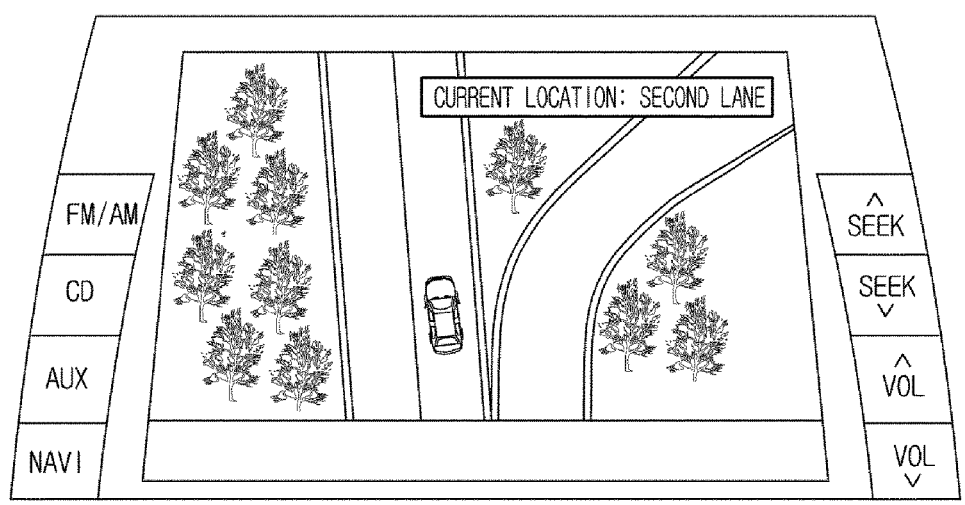

FIGS. 6A and 6B are views illustrating a displaying method of a display unit in accordance with embodiments of the present disclosure.

As mentioned above, the controller 300 may match a current location of the vehicle with a map, and the display unit 134 may visually provide the mapped current location of the vehicle to a driver by displaying the mapped current location of the vehicle. In addition, the display unit 134 may display the determined driving lane together with the mapped current location of the vehicle so as to provide more various driving information to the driver.

According to one embodiment, the display unit 134 may display the current location of the vehicle on a real driving lane of the displayed map. In FIG. 6A, the display unit 134 directly displays that the vehicle is currently driving on the second lane.

According to another embodiment, the display unit 134 may display a driving lane by a text. FIG. 6B illustrates that the display unit 134 displays a notification in a text manner in the upper right portion thereof, wherein the notification is that the current driving lane is the second lane.

The controller 300 may determine a driving lane every pre-determined period. That is, the controller 300 may determine a driving lane by performing the above-mentioned method every the pre-determined period.

Alternatively, the controller 300 may determine a first driving lane by comparing estimated lane line information with reference lane line information at a first point of time, determine whether to change the lane based on the driving information of the vehicle during a single period from the first point of time, and determine a second driving lane depending on the presence of the change of the lane at a second point of time after the single period from the first point of time.

For this, the sensor unit 400 may be mounted inside of the vehicle to estimate driving information of the vehicle. In this time, the driving information of the vehicle may include a direction, an attitude, and a speed. For this, the sensor unit 400 may include a geomagnetic sensor, a gyro sensor, and a vehicle speed sensor.

The controller 300 may confirm whether the vehicle changes a lane based on the estimated driving information, and a direction thereof. When the change of the lane is performed, the controller 300 may determine a driving lane at a current point of time by calculating a changed lane based on a driving lane that is determined at a previous point of time. Otherwise, when the change of the lane is not performed, the controller 300 may determine a driving lane that is determined at a previous point of time as a driving lane at a current point of time.

For example, when it is confirmed that the lane is changed to the left side by one time during a single period from the first point of time, the controller 300 may determine a lane that is upper level by a single lane than the first driving lane as a second driving lane at the second point of time. Otherwise, when it is confirmed that the lane is not changed during a single period from the first point of time, the controller 300 may determine that a second driving lane at the second point of time is the same as the first driving lane.

The above-mentioned method represents a lane tracking, and the controller 300 may count the number of the lane tracking whenever the lane tracking is performed. Since the lane tracking is based on the result of the previous point of time, there may be a risk of accumulating an error as the counted number is increased. Therefore, when the counted number exceeds a predetermined number, the controller 300 may determine a driving lane by comparing the estimated lane line information with reference lane line information again.

FIG. 7 is a flow chart illustrating a control method of a vehicle in accordance with one embodiment of the present disclosure.

At first, the vehicle may confirm the type of a driving road (700). Particularly, the controller 300 of the vehicle may match a received satellite signal with a pre-store map, and then confirm the driving road of the vehicle and the type of the road.

Next, the vehicle may acquire reference lane line information corresponding to the type of the road (710). Reference lane line information may represent characteristics of lane that is required for each type of road. The reference lane line information may be stored in the storage 500 in advance.

At the same time, the vehicle may acquire surrounding information (720). The surrounding information may include information related to the front side, and the lateral side of the vehicle that is used to determine a lane of the vehicle. For this, the vehicle may acquire an image of the front side of the vehicle by the camera 210 and detect an object on the lateral side of the vehicle by the radar 220.

After acquiring the surrounding information, the vehicle may acquire estimated lane line information through the surrounding information (730). When acquiring the front image as the surrounding information, the vehicle may extract information related to a lane of the front road surface from the front image. In addition, when detecting the lateral image as the surrounding information, the vehicle may acquire estimated lane line information determined by the shape of the lateral object and the distance to the lateral object.

When the reference lane line information and the estimated lane line information are acquired, the vehicle may determine a driving lane by comparing the reference lane line information with the estimated lane line information (740). For this, the vehicle may calculate a possibility that each lane becomes a driving lane, particularly may calculate a matching point. The matching point is a method of assigning a point to a certain lane when the reference lane line information is identical to the estimated lane line information, and the controller 300 may determine a lane having the highest matching point as a driving lane.

Figure 8:
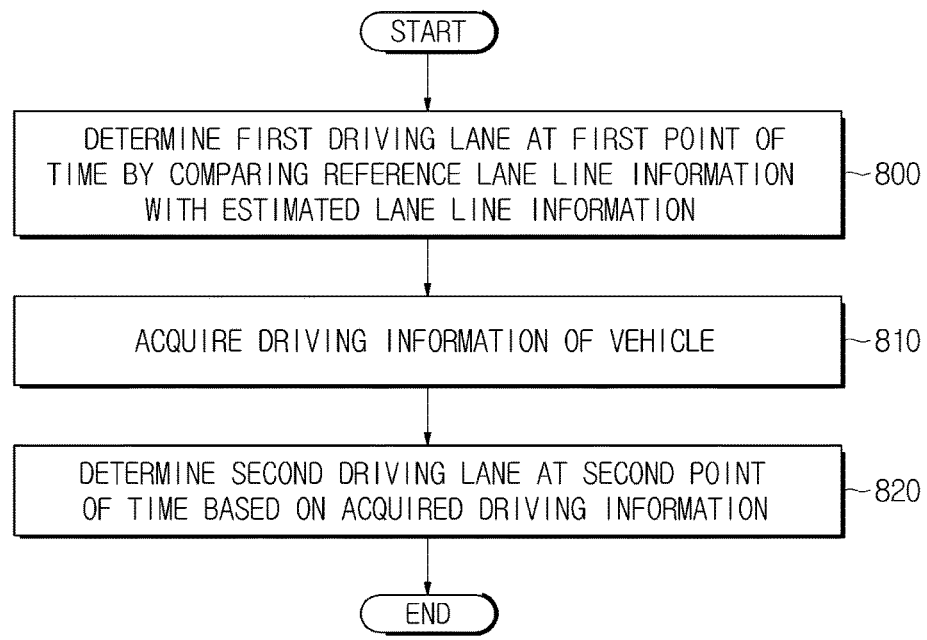
FIG. 8 is a flow chart illustrating a control method of a vehicle in accordance with another embodiment of the present disclosure.

FIG. 8 is a flow chart illustrating a control method of a vehicle in accordance with another embodiment of the present disclosure.

At first, the vehicle may determine a first driving lane by comparing reference lane line information with estimated lane line information at a first point of time (800). A method of determining the first driving lane is the same as those shown in FIG. 7.

Next, the vehicle may acquire driving information of the vehicle during a single period from the first point of time (810). The driving information of the vehicle may include a direction, an attitude and a speed.

At last, the vehicle may determine a second driving lane at a second point of time after a single period from the first point of time based on the acquired driving information (820). Particularly, the vehicle may determine whether the change of the lane is performed during a single period from the first point of time based on the acquired driving information. According to the result of the determination, the vehicle may determine the second driving lane at the second point of time by calculating a lane changed from the first driving lane.

As is apparent from the above description, according to the proposed vehicle and control method of the vehicle, a driving lane may be determined by using lane information corresponding to the type of a driving road and thus a storage space may be efficiently managed.

A driving route in a branch point and an interchange may be estimated in real time.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
 a storage configured to store a map including a type of driving road;
 a surrounding information acquisition unit configured to acquire surrounding information; and
 a controller configured to determine a driving lane by comparing reference lane line information corresponding to the type of the driving road verified based on the map with estimated lane line information based on the surrounding information,
 wherein the controller acquires a possibility that each lane forming the road becomes the driving lane by comparing the reference lane line information with the estimated lane line information, and
 wherein the controller determines a driving lane by comparing the reference lane line information including at least one of the top lane line information and the lowest lane line information corresponding to the type of the driving road with the estimated lane line information based on the surrounding information.

2. The vehicle of claim 1, wherein
 the controller verifies the type of the driving road determined according to at least one of use, shapes, and sizes of the driving load.

3. The vehicle of claim 1, wherein
 the controller determines the type of the driving road as one of a non-highway, a general road of a highway, a bridge of a highway, an overpass of a highway, a tunnel of a highway, an underground road of a highway, a branch point area of a highway within a pre-determined distance from a branch point, and a junction point area of a highway within a pre-determined distance from a junction point.

4. The vehicle of claim 1, wherein
 the controller acquires a possibility that each lane becomes the driving lane with reference to an accuracy of each lane of the estimated lane line information.

5. The vehicle of claim 1, wherein
 the controller acquires the estimated lane line information including at least one of a type and color of lane line on the road, a distance to a lateral object, and a shape of the lateral object from the surrounding information.

6. The vehicle of claim 1, wherein
 the controller determines the driving lane every predetermined period.

7. The vehicle of claim 6, wherein
 the controller determines a first driving lane at a first point of time by comparing the reference lane line information with the estimated lane line information, determines whether to change the lane based on the driving information of the vehicle during a single period from the first point of time, and determines a second driving lane at a second point of time after a single period from the first point of time based on the determined presence of the change of the lane.

8. The vehicle of claim 1, further comprising:
 a display unit configured to display the determined driving lane.

9. A control method of a vehicle comprising:
verifying a type of a driving road;
acquiring reference lane line information corresponding to the verified type of the driving road;
acquiring surrounding information;
acquiring estimated lane line information based on the surrounding information; and
determining a driving lane by comparing the reference lane line information with the estimated lane line information,
wherein the determination of the driving lane comprises acquiring a possibility that each lane forming the road becomes the driving lane by comparing the reference lane line information with the estimated lane line information,
wherein the acquisition of the reference lane line information comprises acquiring the reference lane line information including at least one of the top lane line information and the lowest lane line information corresponding to the type of the road.

10. The control method of claim 9, wherein
the verification of the type of the driving road comprises verifying the type of the driving road that is determined according to at least one of use, shapes, and sizes of the driving load.

11. The control method of claim 9, wherein
the verification of the type of the driving road comprises determining the type of the driving road as any one of a non-highway, a general road of a highway, a bridge of a highway, an overpass of a highway, a tunnel of a highway, an underground road of a highway, a branch point area of a highway within a pre-determined distance from a branch point, and a junction point area of a highway within a pre-determined distance from a junction point.

12. The control method of claim 9, wherein
the determination of the driving lane comprises acquiring a possibility that each lane becomes the driving lane with reference to an accuracy of each lane of the estimated lane line information.

13. The control method of claim 9, wherein
the acquisition of estimated lane line information comprises acquiring the estimated lane line information including at least one of the type and color of lane line on the road, a distance to a lateral object, and a shape of the lateral object from the surrounding information.

14. The control method of claim 9, wherein
the determination of the driving lane comprises determining a first driving lane at a first point of time by comparing the reference lane line information with the estimated lane line information.

15. The control method of claim 14, further comprising:
determining whether to change the lane during a single period from the first point of time based on the driving information of the vehicle; and
determining a second driving lane at a second point of time after a single period from the first point of time based on the determined presence of the change of the lane.

16. The control method of claim 9, further comprising:
displaying the determined driving lane.

* * * * *